United States Patent Office 3,422,964
Patented Jan. 21, 1969

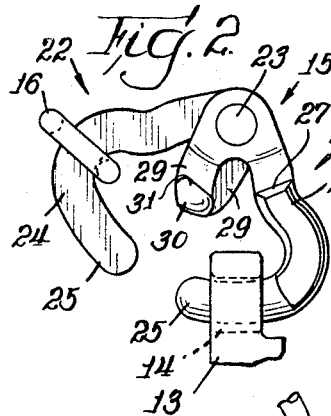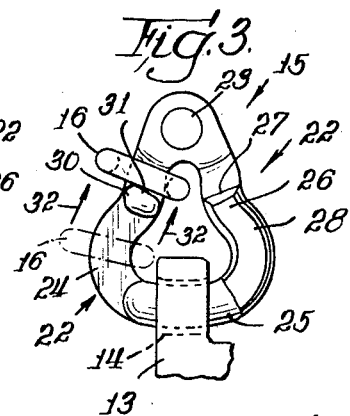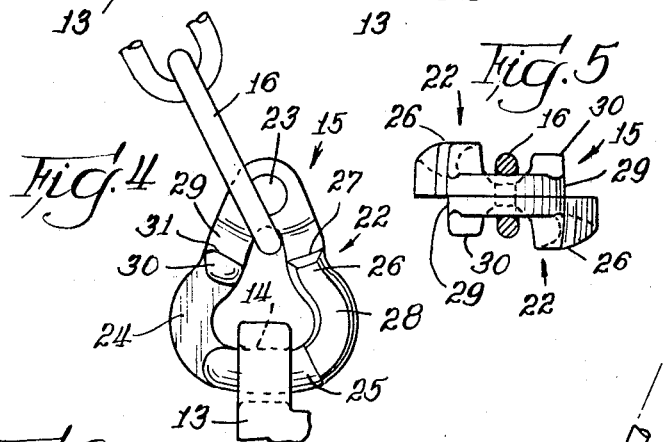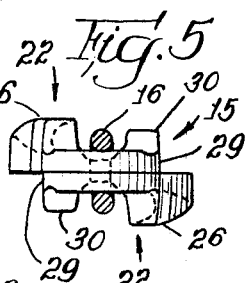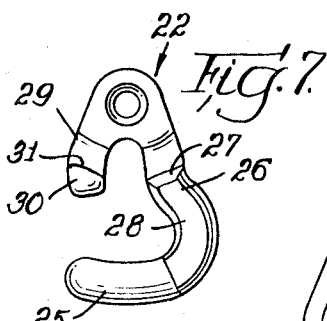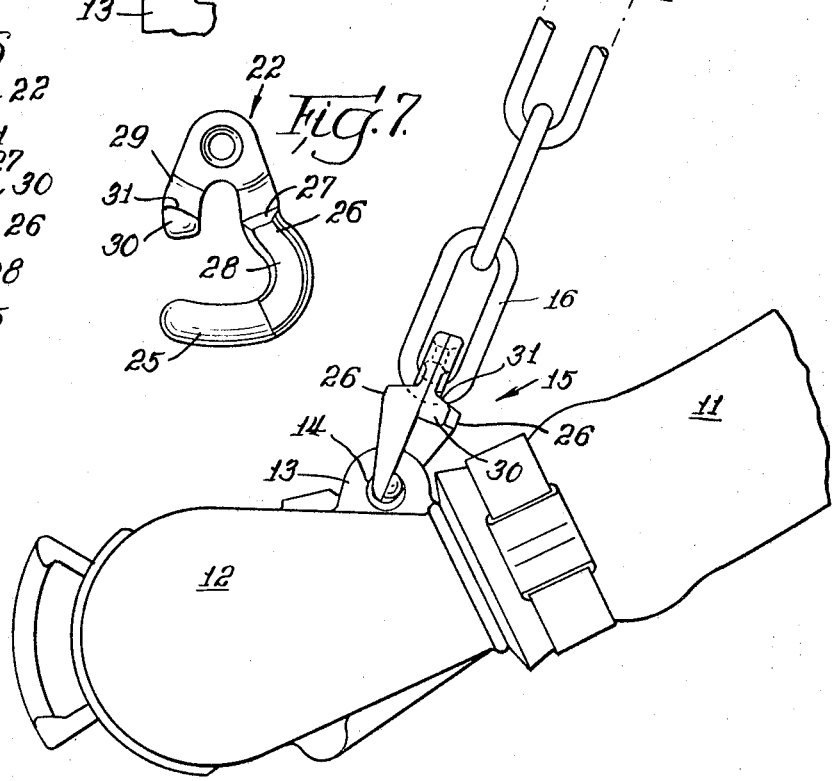

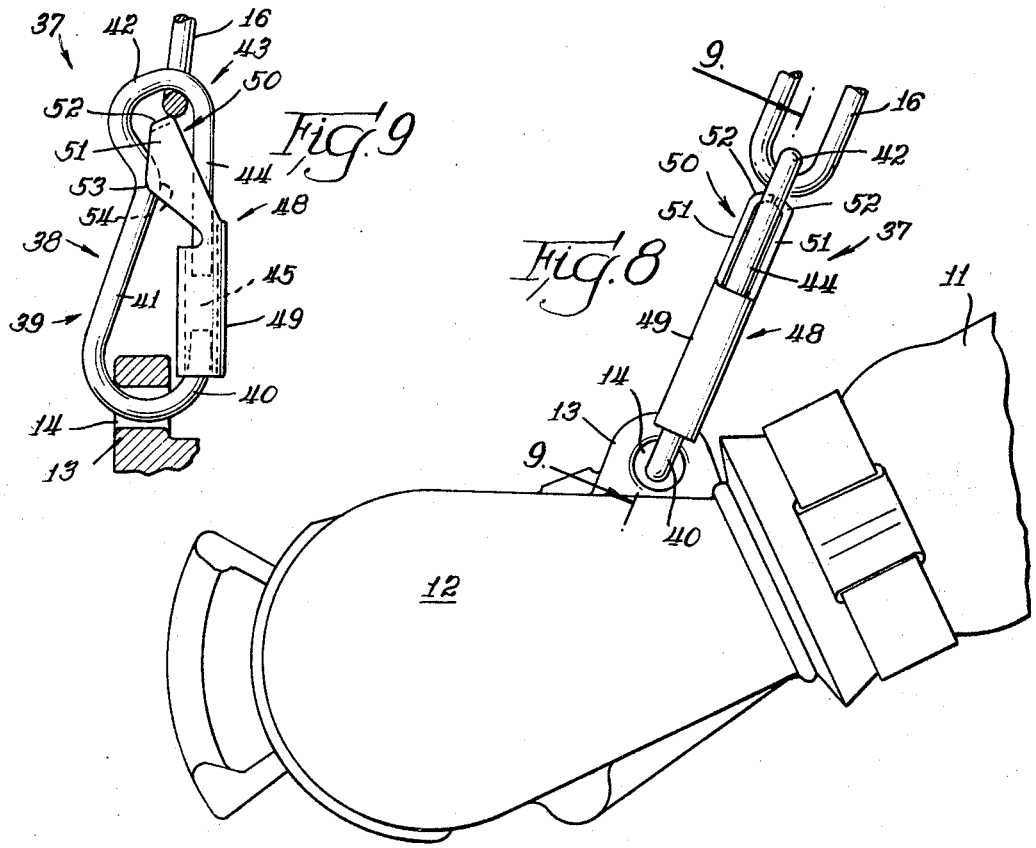
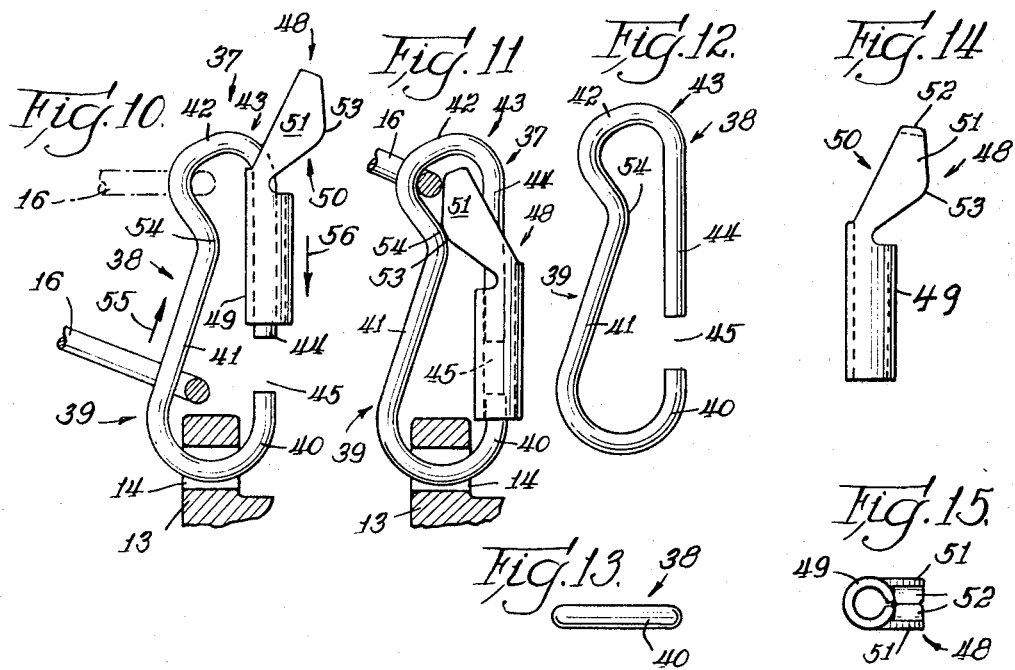

3,422,964
DETACHABLE AND LOCKABLE COUPLING BETWEEN THE DISTAL END OF AN AIR BRAKE HOSE AND THE SUPPORT CHAIN THEREFOR
Rudolph E. Nadherny, Naperville, Ill., assignor to Illinois Railway Equipment Company, Chicago, Ill., a corporation of Illinois
Filed May 16, 1967, Ser. No. 638,894
U.S. Cl. 213—1                                                4 Claims
Int. Cl. B61g 7/00; A44b 13/00

ABSTRACT OF THE DISCLOSURE

The lower link of a chain supporting the distal end of a railway car air brake hose is detachably connected thereto by a lockable coupling.

---

This application relates to copending application Ser. No. 613,803, filed Feb. 3, 1967, and the disclosure thereof is incorporated herein by reference.

Among the objects of this invention are: To provide for simply, quickly and readily connecting the lower link of a chain supporting the distal end of an air brake hose and the coupling at its distal end; to lock the link to the connecting or coupling device to prevent detachment from the hose coupling unless the link is swung from its normal pendant position; and to accomplish the application and removal of the chain coupling device to the hose coupling without requiring the use of special tools.

Two embodiments of coupling devices for interconnecting an apertured ear on an air brake hose coupling and the bottom link of a support chain therefor are disclosed. One of these devices employs a pair of tongs pivoted together at one end which receives the bottom link while the distal ends are swingable in opposite directions through the aperture in the ear into overlapping juxtaposed relation. Arms integral with the tongs extend from their pivot ends and cooperate with the link therebetween to prevent opening of the tongs. Shoulders on the arms and on the tongs prevent removal of the link from between the arms unless the link is rotated to a position about normal to its normal pendant position. The other device employs an upright J-shaped hook with the short arm extending through the aperture in the ear on the hose coupling and the long arm secured to the short arm of an inverted J-shaped hook the long arm of which is spaced from the short arm of the upright J-shaped hook to receive the apertured ear. A keeper is slidably mounted on the long arm of the inverted J-shaped hook to bridge this space. The upper end of the keeper carries a locking portion which holds the keeper in bridging position when the link occupies the uppermost part of the short arm of the inverted J-shaped hook and is rotatable therefrom only when the link is moved to a relatively lower position.

In the drawings: FIG. 1 is a view showing the application of one embodiment of the detachable coupling to an apertured ear on a hose coupling at one end of a railway car and connected to the bottom link of a chain which is secured at its upper end to the railway car. FIG. 2 is a view, at full scale, of the detachable coupling as shown in FIG. 1 with the tongs separated to show how it is applied. FIG. 3 shows the next step in the application of the detachable coupling. FIG. 4 shows the final step in the application of the detachable coupling. FIG. 5 is a top plan view of the detachable coupling, the bottom link being shown in section. FIG. 6 is a view, in side elevation, of one of the tongs making up the detachable coupling. FIG. 7 is a view, in front elevation, of the tong shown in FIG. 6. FIG. 8 shows how another embodiment of the detachable coupling is applied to the hose coupling and to the bottom link of the support chain. FIG. 9 is a view, in side elevation, of the detachable coupling shown in FIG. 8, the illustration being at full scale. FIG. 10 shows how the detachable coupling illustrated in FIGS. 8 and 9 is applied to the bottom link of the chain and to the apertured ear on the hose coupling. FIG. 11 shows the next step in the application of the detachable coupling. FIG. 12 is a view, in side elevation, of the double hook member that forms a part of the detachable coupling shown in FIGS. 8, 9, 10 and 11. FIG. 13 is a bottom plan view of the double hook member shown in FIG. 12. FIG. 14 is a view, in side elevation, of the keeper for the detachable coupling. FIG. 15 is a bottom plan view of the keeper shown in FIG. 14.

In FIG. 1 the reference character 10 designates a portion of a railway car at one end where an air brake hose 11 is located in accordance with conventional practice. A hose coupling 12 is provided for connecting the air brake hose 11 to a similar coupling on the next car for the purpose of providing continuity for the air line that extends from each end of the car to the other. The hose coupling 12 is provided with an integral upstanding ear 13 which has an aperture 14 that can be employed for receiving a part of a detachable coupling, indicated generally at 15, which forms one embodiment of this invention. The detachable coupling 15 is connected to a bottom link 16 of a support chain 17 the upper link 18 of which is connected to chain lock means 19 that is secured to the portion 10 of the railway car as described in the above identified copending application.

FIGS. 2–7 show the details of construction of the detachable coupling 15. It includes a pair of tongs 22, each identical to the other, and formed preferably of drop forged steel, although other material can be employed. At their upper ends the tongs 22 are pivotally interconnected by a pivot pin 23 in the form of a brass rivet, although other material can be employed. Each tong 22 has a flat side 24 and the distal end 25 is elongated and is semi circular in cross section for entering the aperture 14 in the upstanding ear 13 on the hose coupling 12. The semi circular distal end portions 25, when juxtaposed and in overlapping engagement, provide a circular portion for connection to the apertured ear 13. Each tong 22 has an integral upstanding shoulder portion 26 the upper surface 27 of which is arranged to provide a stop for the bottom link 16 of the chain 17 when it occupies the normal pendant position. The width 28 of the tong 22 decreases from the shoulder portion 26 to the distal end 25 as seen more clearly in FIG. 6.

Interlocking means between the bottom link 16 and the detachable coupling 15 is provided by an arm 29 on each of the tongs 22. It extends from the pivot end in overlying relation to the other tong. When the bottom link 16 is positioned as shown in FIG. 4 between the arms 29 of the tongs 22, the tongs 22 cannot be separated and thus the semi circular distal ends 25 cannot be withdrawn from the aperture 14 in the ear 13. At the distal end of each arm 19 there is an outstanding shoulder portion 30 having an upper surface 31 which is located at substantially the same elevation as the upper surface 27 on the corresponding shoulder portion 26. The surfaces 27 and 31 are inclined toward each other to receive the corresponding side of the bottom link 16.

The detachable coupling 15 can be applied to and removed from the apertured upstanding ear 13 and the bottom link 16 of the chain 17 without the use of any special tools. The application is shown beginning with FIG. 2. The bottom link 16 is applied over the distal end 25 of one of the tongs 22 while the distal end 25 of the other tong 22 is inserted through the aperture 14 in the ear 13 on the hose coupling 12. Then, as shown in FIG. 3, the left tong 22 is swung toward the right tong 22 which brings the distal end 25 of the former into overlapping juxtaposed engagement with the distal end 25 of the latter within the aperture 14. In this position the shoulder portions 26 on the tongs 22 are in alignment with the shoulder portions 30 on the other tong 22 as shown in FIG. 5. The bottom link 16 then is moved upwardly as indicated by arrows 32 in FIG. 3 with the link 16 in such position that it extends at right angles to the plane of the tongs 22. In this position the opening in the link 16 is such that the link can pass the shoulder portions 26 and 30 to the position shown in FIG. 3. Then the bottom link 16 is swung around the juxtaposed portions of the arm 29 of one tong 22 and the other tong 22 to the normally pendant position shown in FIG. 4. Here the pivot portions of the tongues 22 extend through the opening in the bottom link 16. The arms 29 on opposite sides of the bottom portion of the bottom link 16 prevent opening movement of the tongs 22 sufficiently far to withdraw the semi circular distal ends 25 from overlapping engagement within the aperture 14 in the upstanding ear 13 on the hose coupling 12.

The detachable coupling 15 can be removed from the hose coupling 12 and from the bottom link 16 of the chain 17 only after the bottom link 16 has been swung from the normal pendant position through about 90° or normal to the normal pendant position where it can be moved past the aligned shoulder portions 26 and 30 on the tongs 22. Then the foregoing steps are reversed for removing the detachable coupling 15.

In FIGS. 8–15 there is indicated, generally, at 37 another embodiment of the detachable coupling of this invention. The detachable coupling 37 comprises two parts. One of these parts is a double hook member that is indicated, generally, at 38 and is formed preferably of steel wire. The double hook member 38 includes an upright J-shaped hook 39 the short arm 40 of which is arranged, as shown in FIGS. 9 and 10, to be inserted in the aperture 14 of the upstanding ear 13 on the hose coupling 12. The long arm 41 of the upright J-shaped hook 39 has as an integral extension a short arm 42 of an inverted J-shaped hook 43 which has a long arm 44 the distal end of which is spaced from the distal end of the short arm 40 to provide a space 45 therebetween for receiving the upstanding ear 13. The bottom link 16 of the support chain 17 is located within the short arm 42 of the inverted J-shaped hook 43 when the bottom link 16 occupies the normal pendant position.

The other part of the detachable coupling 37 is a keeper that is indicated, generally, at 48 and is slidably mounted on the long arm 44 of the inverted J-shaped hook 43. The keeper 48 is formed from a single piece of flat steel plate and includes a cylindrical portion 49 which loosely fits over the long arm 44 and also over the distal end of the short arm 40 to bridge the space 45 therebetween and thus secure the detachable coupling 37 from disconnection with the apertured ear 13.

Interlocking means between the keeper 48 and the double hook member 38 includes a locking portion 50 at the upper end of the keeper 48. The locking portion 50 comprises spaced sides 51 which have inturned upper ends 52 to provide a generally rectangular configuration that straddles the double hook member 38 with the inturned upper ends 52 underlying the bottom portion of the bottom link 16 thereby preventing movement of the keeper 48 and maintaining the detachable coupling 37 in connected position between the apertured ear 13 and the bottom link 16. The locking portion 50 has shoulders 53 on the spaced sides 51 which are arranged, as shown in FIG. 9, to overlie the juncture 54 between the inclined long arm 41 of the upright J-shaped hook 39 and the similarly inclined distal end of the short arm 40 of the inverted J-shaped hook 43. It is only when the bottom link 16 is moved to the alternate position shown in FIG. 11 that the keeper 48 can be moved upwardly sufficiently far to have one or the other of the shoulders 53 clear the juncture 54 so that the keeper 48 can be turned through about 90° to position the inturned upper ends 52 out of alignment with the short arm 42 and thus permit it to be slid along the long arm 44 to uncover the space 45.

The steps in applying the detachable coupling 37 to the bottom link 16 and to the apertured upstanding ear 13 are shown in FIG. 10. The short arm 40 is inserted through the bottom link 16 and then through the aperture 14 in the ear 13 with the keeper 48 in the position here shown. Then the bottom link 16 is moved upwardly to the broken line position thereof in the direction indicated by the arrow 55. The keeper 48 is moved downwardly, as indicated by arrow 56, to bridge the space 45 and then it is rotated through about 90° to the position shown in FIG. 11 in which one or the other of the shoulders 53 is swung past the juncture 54. Then the keeper 48 is moved further downwardly to the position shown in FIG. 9 and the link 16 then is moved to the normally pendant position thereof. The steps for removing the coupling 37 from the apertured ear 13 and the bottom link 16 are the reverse of those described for its application thereto.

What is claimed as new is:

1. An improvement in a railway car construction having at each end an air brake hose connected at one end to an air line on said car and a hose coupling at its distal end for connection to a like coupling on the next car, said hose coupling having an apertured ear, wherein said improvement comprises a chain connected at one end to said car, and a detachable coupling interconnecting a link at the other end of said chain to said ear including a portion extending through the aperture in said ear, and interlocking means cooperating with said link at said other end of said chain and said coupling preventing disengagement of said coupling from said ear, said detachable coupling means including a pair of tongs pivoted together at one end with the distal ends constituting said portion and extending in opposite directions through said aperture and into overlapping juxtaposed relation, and said interlocking means includes an arm integral with each tong and extending at an acute angle from the pivot end thereof into overlying relation with the other tong, said link being positioned between the arms of said tongs and preventing withdrawal of said distal ends from said aperture.

2. The improvement set forth in claim 1 wherein a shoulder portion extends laterally from the distal end of each arm to limit downward movement of said link and requires that said link be rotated to a position about normal to its normal pendant position to permit detachment of said coupling from said ear and detachment of said link from said coupling.

3. The improvement set forth in claim 2 wherein each tong has a shoulder portion the upper surface of which is at about the same elevation as the upper surface of the shoulder portion on the distal end of the respective arm and the width of each tong decreases from the respective shoulder portion thereon to the distal end portion thereof.

4. An improvement in a railway car construction having at each end an air brake hose connected at one end to an air line on said car and a hose coupling at its distal end for connection to a like coupling on the next car, said hose coupling having an apertured ear, wherein said improvement comprises a chain connected at one end to said car, and a detachable coupling interconnecting a link at the other end of said chain to said ear including a portion extending through the aperture in said ear, said interlocking means cooperating with said link at said other end of said chain and said coupling preventing disengagement of said coupling from said ear, said detachable coupling means including an upright J-shaped hook with its short arm extending through said aperture, an inverted J-shaped hook with its short arm constituting an integral extension of said long arm aligned with and spaced from said short arm of said upright J-shaped hook to provide a space for receiving said ear, the lower end of said link in its normal pendant position engaging said short arm of said inverted J-shaped portion, a keeper slidably mounted on said long arm of said inverted J-shaped hook and bridging said space said interlocking means including a locking portion on the upper end of said keeper rotatable therewith into underlying relation to said short arm of said inverted J-shape hook and to said link therein, the juncture between said long arm of said upright J-shaped hook and said short arm of said inverted J-shaped hook is so spaced from said long arm of the latter as to permit rotation of said locking portion to unlocked position only when said link is moved relatively downwardly from its normal pendant position.

References Cited

UNITED STATES PATENTS

| | | | |
|---|---|---|---|
| 1,415,692 | 5/1922 | Pavoni | 24—241 |
| 1,594,752 | 8/1926 | Pretlove | 24—242 |
| 2,216,499 | 10/1940 | Ohotto | 24—241 |
| 2,795,024 | 6/1957 | Donaldson | 24—73 |
| 2,952,290 | 9/1960 | Gaspardo | 24—242 X |
| 3,002,242 | 10/1961 | Donaldson | 24—242 X |
| 3,344,935 | 10/1967 | Stewart et al. | 213—1 |

DRAYTON E. HOFFMAN, *Primary Examiner.*

U.S. Cl. X.R.

24—73, 241, 242